(12) United States Patent
Yabe

(10) Patent No.: US 11,487,488 B2
(45) Date of Patent: Nov. 1, 2022

(54) CONTROL APPARATUS, CONTROL METHOD, AND STORAGE MEDIUM FOR PERFORMING A PREDETERMINED IMAGE PROCESSING BASED ON A RESULT OF CALIBRATION ON IMAGE DATA

(71) Applicant: CANON KABUSHIKI KAISHA, Tokyo (JP)

(72) Inventor: Takashi Yabe, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/125,721

(22) Filed: Dec. 17, 2020

(65) Prior Publication Data
US 2021/0200493 A1 Jul. 1, 2021

(30) Foreign Application Priority Data
Dec. 27, 2019 (JP) .............................. JP2019-239172

(51) Int. Cl.
*G06F 3/12* (2006.01)
*H04N 1/00* (2006.01)
*H04N 1/60* (2006.01)

(52) U.S. Cl.
CPC ............ *G06F 3/1285* (2013.01); *G06F 3/121* (2013.01); *G06F 3/1204* (2013.01); *H04N 1/00045* (2013.01); *H04N 1/00087* (2013.01); *H04N 1/6097* (2013.01)

(58) Field of Classification Search
CPC ........... H04N 1/00045; H04N 1/00087; H04N 1/6097
See application file for complete search history.

(56) References Cited

U.S. PATENT DOCUMENTS

| | | | | |
|---|---|---|---|---|
| 2002/0149799 A1* | 10/2002 | Hayashi | ............. | H04N 1/32502 358/406 |
| 2007/0019258 A1* | 1/2007 | Hattori | ................... | H04N 1/603 358/518 |
| 2010/0177365 A1* | 7/2010 | Chung | ................. | H04N 1/6033 358/504 |
| 2014/0146331 A1* | 5/2014 | Sato | ..................... | H04N 1/6097 358/1.9 |
| 2018/0131818 A1* | 5/2018 | Yano | .................... | G06K 15/027 |

FOREIGN PATENT DOCUMENTS

| | | | | |
|---|---|---|---|---|
| JP | 2005-343066 A | | 12/2005 | |
| JP | 2011066862 A | * | 3/2011 | ........... H04N 1/6055 |
| JP | 2019149658 A | * | 9/2019 | ........... H04N 1/6055 |

OTHER PUBLICATIONS

English translation of Japanese Application 2018-032773 (corresponding to Japanese Application Publication 2019-149658). (Year: 2009).*

English translation of Japanese Application 2009-218210 (corresponding to Japanese Application Publication 2011-066862). (Year: 2018).*

* cited by examiner

*Primary Examiner* — Thomas D Lee
(74) *Attorney, Agent, or Firm* — Canon U.S.A., Inc. IP Division

(57) ABSTRACT

In response to reception of instructions to print a color sample from a user, first, a printing unit is caused to perform calibration. Then, after the calibration is completed in the printing unit, control is performed so that print data is generated by execution of predetermined image processing for image data representing the color sample and printing processing of the print data is performed in the printing unit.

13 Claims, 15 Drawing Sheets

CONTROL APPARATUS, CONTROL METHOD, AND STORAGE MEDIUM FOR PERFORMING A PREDETERMINED IMAGE PROCESSING BASED ON A RESULT OF CALIBRATION ON IMAGE DATA

BACKGROUND OF THE DISCLOSURE

Field of the Disclosure

The aspect of the embodiments disclosure relates to a color adjustment technique in a printer that prints digital image data.

Description of the Related Art

Digital image data created by using an application on a PC (Personal Computer) is sent to a printer via a network and converted into print data within the printer and subjected to printing processing. Normally, digital image data includes three color components of red (R), green (G), and blue (B). Then, print data includes color components corresponding to four kinds of color material used by a printer, that is, four color components of cyan (C), magenta (M), yellow (Y), and black (K). Consequently, within a printer, it is necessary to convert a color represented by RGB into a color represented by CMYK and at this time, generally, color conversion is performed so that the color becomes close to the tint in the digital image data displayed on a monitor of the PC.

In a use, such as a so-called POP advertisement, for an arbitrary adjustment-target color (for example, corporate color or the like) on a digital image, special color conversion to convert the color into an aimed color (destination color) specified by a user is required in place of the general color conversion to match the color with the tint of a monitor described above. Hereinafter, this color conversion is called "special color conversion". In performing this special color conversion, there is a case where a color sample is used in order to cause a user to specify a destination color for an adjustment-target color. The user prints the color sample in which color patches correspond to each of a plurality of colors, which are destination color candidates, are arranged and specifies a destination color by referring to the scanned image thereof to select a color patch having a desired color. At the time of printing of this color sample, the tone characteristic of a printer is to be in the standard state in order to guarantee the tint.

Further, for example, at the time of purchase of a new printer, there is a case where it is desired to perform the special color conversion that has been performed by the old printer before the purchase also by the newly purchased printer. At this time, it is considered to set a destination color in the new printer by using the output results by the old printer as a color sample, and at this time, the tone characteristic of the old printer is to be in the standard state in order to guarantee the tint of the destination color.

Normally, the tone characteristic of a printer enters the standard state by performing tone calibration and it is made possible to guarantee the tint in the printing results. In this regard, Japanese Patent Laid-Open No. 2005-343066 has described a technique to notify a user of the necessity of tone calibration in a case where it is necessary by determining whether or not tone calibration is necessary before performing printing processing for digital image data. In a case of this technique, a user is prompted to perform tone calibration, and therefore, whether tone calibration is performed actually depends on the user's will. That is, this technique does not guarantee that the tone characteristic is in the standard state at the time of printing. Even by performing printing of the color sample described above in the state where the tone characteristic deviates from the standard state, appropriate results are not obtained, and therefore, in that meaning, the technique of Japanese Patent Laid-Open No 2005-343066 described above cannot be said to be sufficient.

SUMMARY OF THE DISCLOSURE

An apparatus that controls a processing unit configured to generate print data that can be processed by a printing unit by performing predetermined image processing for printing-target image data; and the printing unit, and includes: a control unit configured to: cause the printing unit to perform calibration in response to reception of instructions to print a color sample from a user; cause, after the calibration is completed, the processing unit to perform a predetermined image processing on image data representing a color sample; and cause the printing unit to perform printing processing of the image data subjected to the predetermined image processing.

Further features of the disclosure will become apparent from the following description of exemplary embodiments with reference to the attached drawings.

DESCRIPTION OF THE EMBODIMENTS

In the following, with reference to the attached drawings, the present disclosure is explained in detail in accordance with exemplary embodiments. The configurations shown in the following embodiments are merely exemplary and the present disclosure is not limited to the configurations shown schematically.

First Embodiment

<Configuration of Print System>

Figure 1:
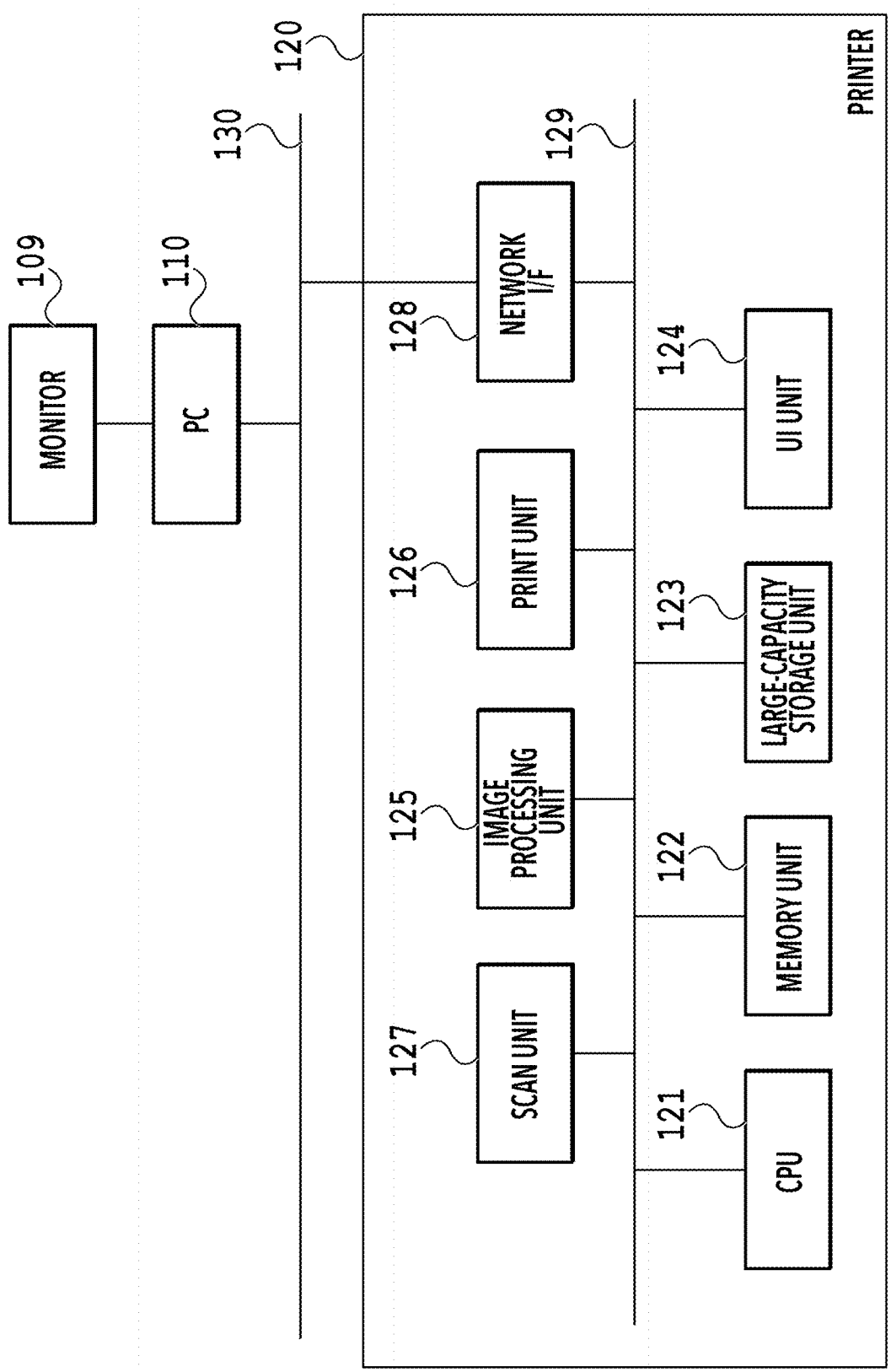
FIG. 1 is a block diagram showing an example of a configuration of a print system according to a first embodiment.

FIG. 1 is a diagram showing an example of a configuration of a print system according to the present embodiment. A printer 120 is connected with a PC (Personal Computer) 110 via a network 130. The network 130 is, for example, LAN, WAN and the like.

In the PC 110, a printer driver is installed, in addition to applications that perform document creation and table creation. In a case of printing digital image data created by an arbitrary application, a user converts the digital image data into PDL (Page Description Language) data by the printer driver and transmits the obtained PDL data to the printer 120 via the network 130. Further, to the PC 110, a monitor 109 is connected and the monitor 109 displays digital image data created by various applications and so on.

The printer 120 comprises a CPU 121, a memory 122, a large-capacity storage unit 123, a UI (User Interface) unit 124, an image processing unit 125, a print unit 126, a scan unit 127, and a network I/F 128. Then, each of these units is connected to one another via a bus 129. The CPU 121 is in charge of the control of the entire printer 120 and interprets received PDL data by a PDL interpreter and converts the PDL data into bitmap data for print by rendering. It may also be possible to perform rendering by software by using the CPU 121 and there is no problem even in a case where rendering is performed by dedicated hardware. By rendering, bitmap data having a plurality of color components per pixel is generated. The plurality of color components refers to independent color components in a predetermined color space, such as R (red), G (green), B (blue), or C (cyan), M (magenta), Y (yellow), K (black), and the like. The bitmap data has a value of eight bits (256 tones) per color component for each pixel. That is, the bitmap data is multi-valued image data including multi-valued pixels. Further, in the rendering, in addition to printing-target image data, attribute data indicating the attribute of each pixel in the image data is also generated. This attribute data indicates to which kind of object each pixel belongs and stores a value indicating the kind of object, for example, such as character, graphics, and image, as attribute information. The network I/F 128 is an interface for connecting the printer 120 to the PC 110 or other apparatuses (not shown schematically) via the network 130 and performing transmission and reception of various kinds of data therewith. The memory unit 122 includes a RAM as a work area of the CPU 121 and a ROM for storing various programs. The large-capacity storage unit 123 includes, for example, an HDD and an SSD, and used for storage of the OS, programs, PDL data received from the PC 110, or the like. The UI unit 124 includes a touch panel that also functions as a display for producing various displays and hardware buttons. The image processing unit 125 generates print data that the print unit 126 can process by performing predetermined image processing for bitmap data obtained by rendering. The print unit 126 performs printing processing on a printing medium, such as paper, based on the print data generated by the image processing unit 125. The scan unit 127 generates image data (scanned image data) by optically reading a document set on a document table or the like, not shown schematically.

The software that implements various operations and processing in the printer 120 is stored in, for example, a computer readable medium including the above-described large-capacity storage unit 123. The software is implemented by being loaded from the computer readable medium onto the RAM within the memory unit 122 and by the CPU 121 executing the software.

<Details of Image Processing Unit>

Figure 2:
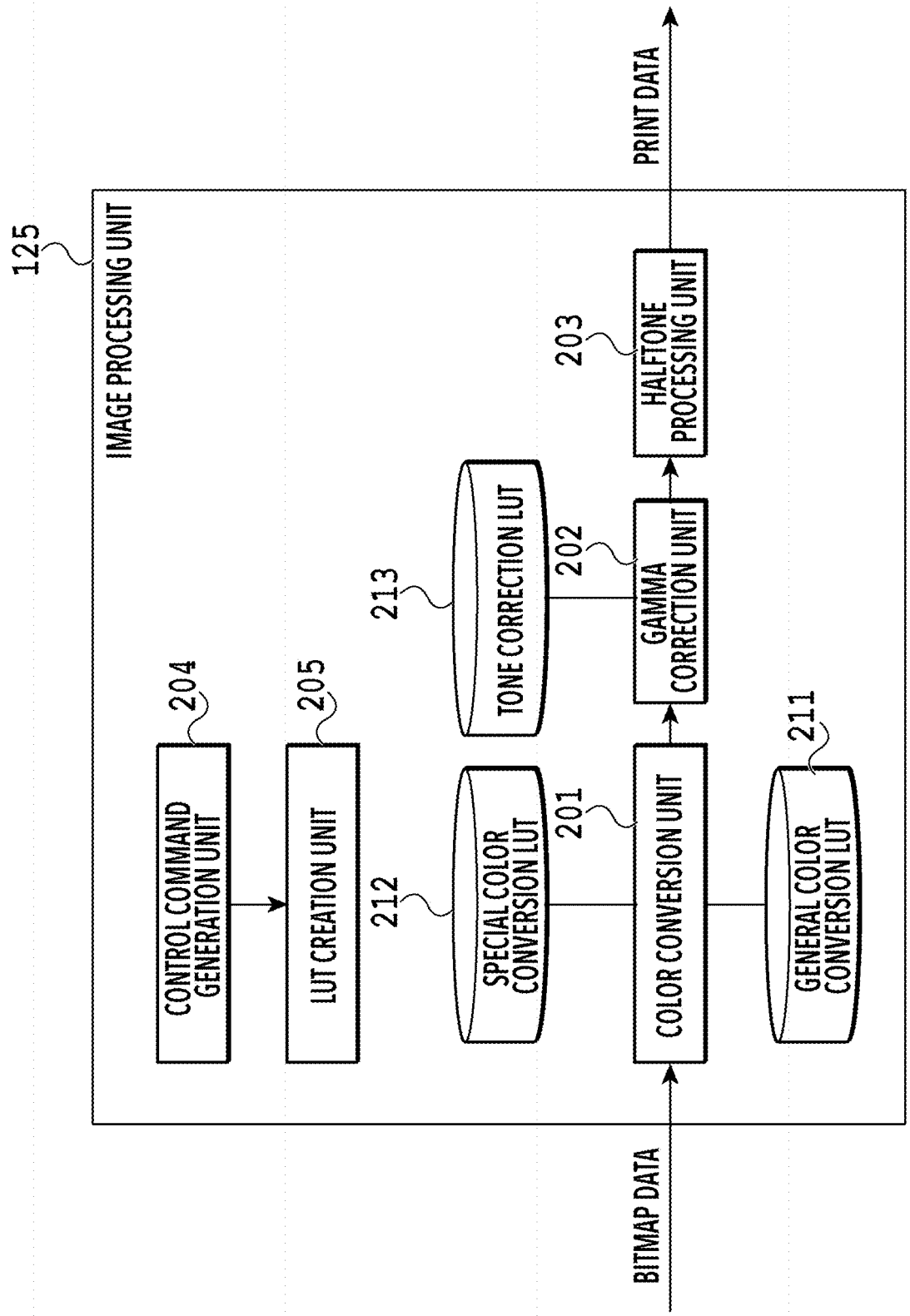
FIG. 2 is a function block diagram showing an internal configuration of an image processing unit according to the first embodiment.

FIG. 2 is a function block diagram showing an internal configuration of the image processing unit 125 according to the present embodiment. The image processing unit 125 has a color conversion unit 201, a gamma correction unit 202, a halftone processing unit 203, a control command generation unit 204, and an LUT creation unit 205. In the following, each function block is explained.

The color conversion unit 201 performs color conversion processing to convert the color space (here, RGB color space) of the input bitmap data into the color space (here, CMYK) for print data by using a color conversion table. In the normal color conversion, a general color conversion LUT 211 is used. "LUT" is an abbreviation of a lookup table and stores input values and output values in association with each other at a plurality of discrete points (corresponding to grid points, to be described later) within the color space. The general color conversion LUT 211 is a color conversion table for converting the color values (RGB values) of various tones in the RGB color space into the corresponding color values (CMYK values) in the CMYK color space and is created and stored in advance in a case where the tone characteristic of the printer 120 is in the standard state. Further, the color conversion unit 201 also performs the special color conversion described previously. In this special color conversion, based on a special color conversion LUT 212, specific RGB values corresponding to an adjustment-target color within bitmap data are converted into specific CMYK values corresponding to a destination color specified by a user.

The gamma correction unit 202 performs gamma correction processing for the bitmap data in the CMYK color space obtained by the color conversion processing by using a tone correction table (tone correction LUT 213).

The halftone processing unit 203 generates print data represented by halftone dots by performing halftone processing for the bitmap data in the CMYK color space after the gamma correction processing. The generated print data is sent to the print unit 126.

The control command generation unit 204 generates control commands for creating the various LUTs described above. The LUT creation unit 205 creates the various LUTs described above in accordance with the control commands generated by the control command generation unit 204.

<Creation Processing of Special Color Conversion LUT>

Figure 3:
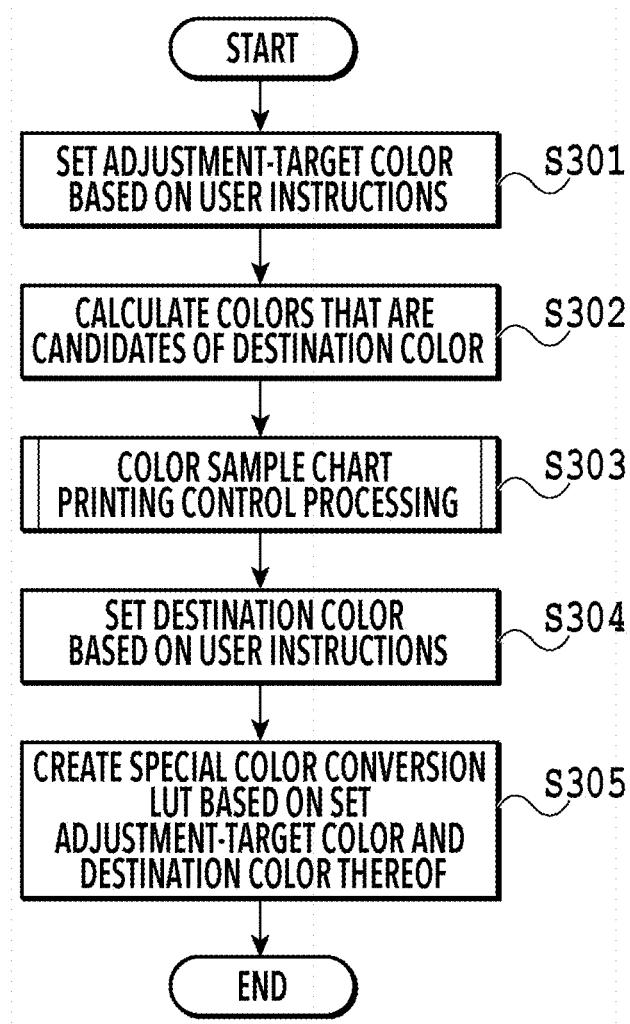
FIG. 3 is a flowchart showing a flow of creation processing of a special color conversion LUT according to the first embodiment.

FIG. 3 is a flowchart showing a flow of creation processing of the special color conversion LUT 212 in the image processing unit 125 according to the present embodiment. In the following, along the flowchart in FIG. 3, a series of flows of creation of the special color conversion LUT is explained. In the following explanation, symbol "S" means a step.

At S301, an arbitrary adjustment-target color within printing-target image data (bitmap data) is set via the UI unit 124.

For example, a printing-target image is displayed on the screen of the UI unit 124 and a user performs a touch operation to the portion of a color desired to be adjusted and a color represented by RGB value at the position relating to the touch operation is set as an adjustment-target color. Here, it is assumed that a color whose RGB values=(R1, G1, B1) is set as an adjustment-target color.

At S302, colors that are candidates of the destination color aimed at by the adjustment-target color set at S301 are determined. The true color is not known until it is printed actually, and therefore, a plurality of candidate colors is determined. Specifically, a plurality of candidate colors is determined by calculating a plurality of colors obtained by changing the set adjustment-target color stepwise. As the method of changing the color at this time, for example, a method is adopted that adds a predetermined change amount to the adjustment-target color for each of R, G, and B. The plurality of candidate colors thus determined is also displayed on the screen of the UI unit 124.

Figure 4A:
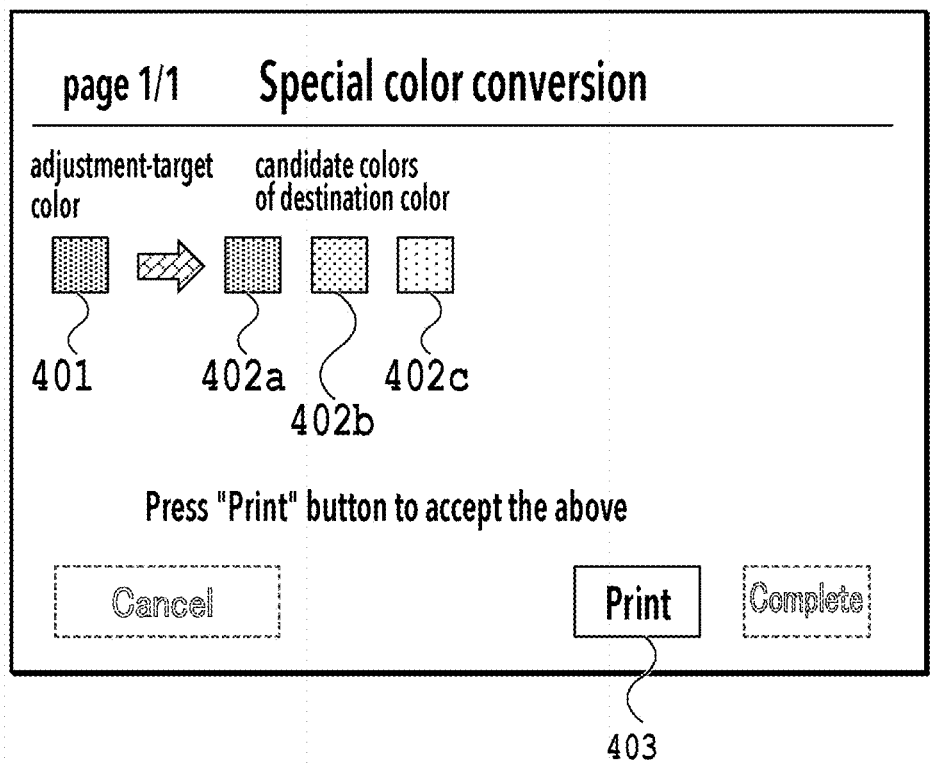
FIG. 4A and FIG. 4B are each a diagram showing an example of a UI screen at the time of performing special color conversion.
Figure 4B:
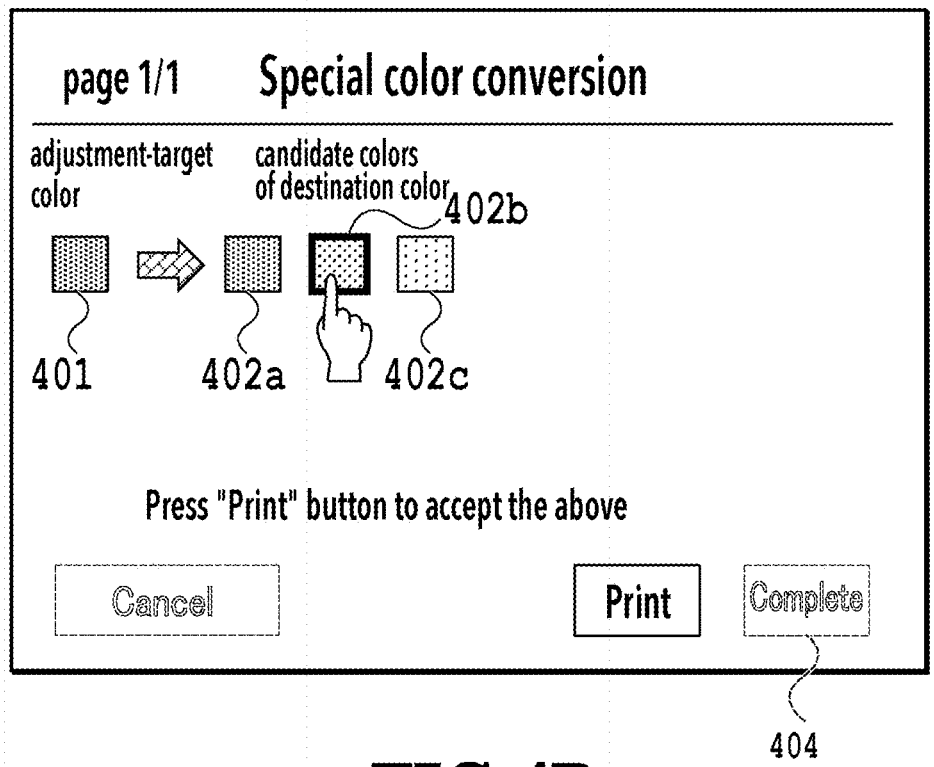
Figure 5:
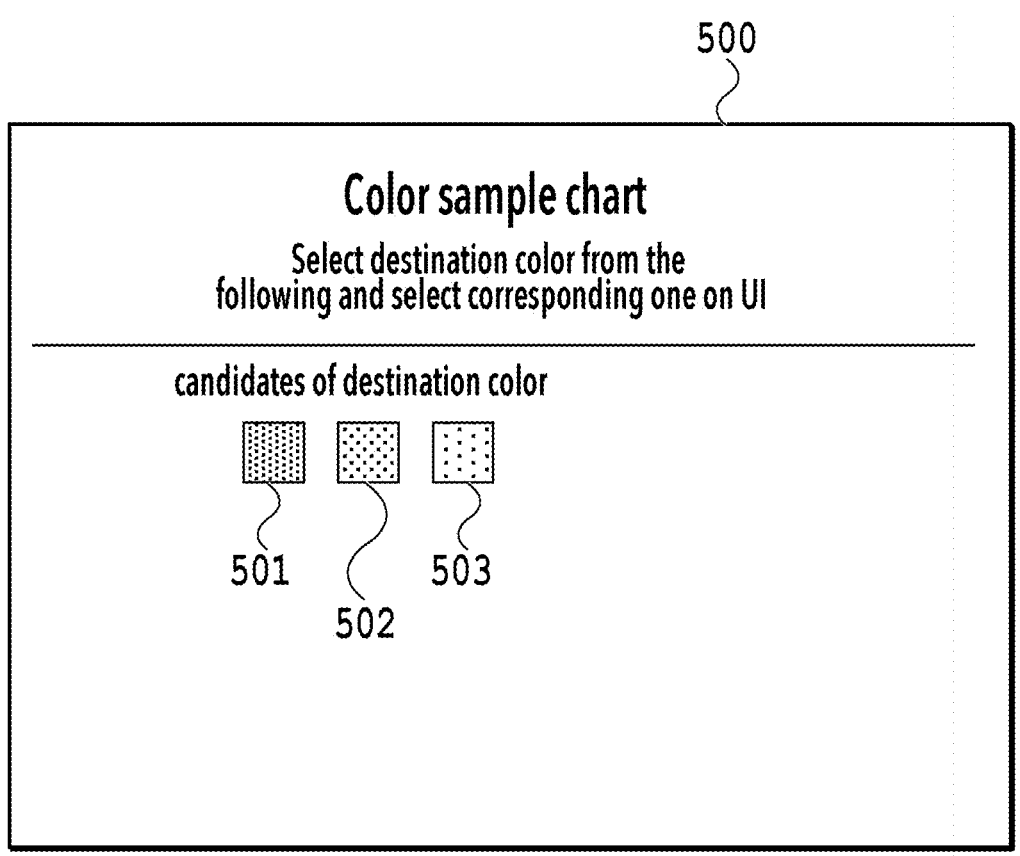
FIG. 5 is a diagram showing an example of a color sample chart that is printed and output.

At S303, printing control processing of a chart (color sample chart) in which a color patch corresponding to each of the plurality of candidate colors determined at S302 is arranged is performed. FIG. 4A and FIG. 4B are each a diagram showing an example of the UI screen at the time of performing special color conversion. Then, FIG. 4A shows a state of the UI screen in the scene in which instructions to print the color sample chart are received. In a square 401 within the UI screen shown in FIG. 4A, the color corresponding to the adjustment-target color is displayed and in three squares 402a to 402c, the colors corresponding to the plurality of candidate colors respectively are displayed. Here, the number of candidate colors is three, but the number is not limited to this. In a case where a user presses down a "Print" button 403, image data of the color sample chart is generated and sent to the print unit 126 and printed and output. FIG. 5 is a diagram showing an example of a color sample chart that is printed and output. In a color sample chart 500 shown in FIG. 5, three color patches 501 to 503 corresponding to the three squares 402a to 402c described above are formed. Then, in order to guarantee that the tone characteristic of the printer 120 is in the standard state at the point in time at which printing of the color sample chart such as this is performed, prior to the printing of the color sample chart, updating of the tone correction LUT 213 and gamma correction processing using the updated tone correction LUT 213 are performed. Details of the control from the instructions to print the color sample chart until the color sample chart is printed and output actually will be described later.

At S304, a destination color for the adjustment-target color set at S301 is set based on user instructions via the UI unit 124. FIG. 4B shows a state of the UI screen in the scene in which selection of a destination color is received. A user selects one square portion by a touch operation or the like, which corresponds to the destination color for the adjustment-target color, from among the plurality of candidate colors displayed within the UI screen by checking the aimed color while watching the color sample chart that is printed and output. In the example in FIG. 4B, the square 402b is selected and in a case where a "Complete" button 404 is pressed down in this state, the color represented by the CMYK values in the color sample chart corresponding to the color being selected is set as the destination color. Here, it is assumed that the color whose CMYK values=(C1, M1, Y1, K1) is set as the destination color.

At S305, the special color conversion LUT 212 for special color conversion is created by which in a case where the RGB values (R1, G1, B1) of the adjustment-target color set at S301 are input, the CMYK values (C1, M1, Y1, K1) of the destination color set at S304 are output. By using this special color conversion LUT 212 in color conversion processing, in a case where the RGB values in a certain pixel within input image data are (R1, G1, B1), the CMYK values after the color conversion are (C1, M1, Y1, K1). In a case where there is a plurality of adjustment-target colors, the LUT creation unit 205 creates the special color conversion LUT 212 in which the CMYK values of the destination color are associated with the RGB values of each adjustment-target color, respectively.

The above is a rough flow until the special color conversion LUT 212 used at the time of the color conversion unit 201 performing special color conversion processing is created.

<Details of Color Sample Chart Printing Control Processing>

Figure 6:
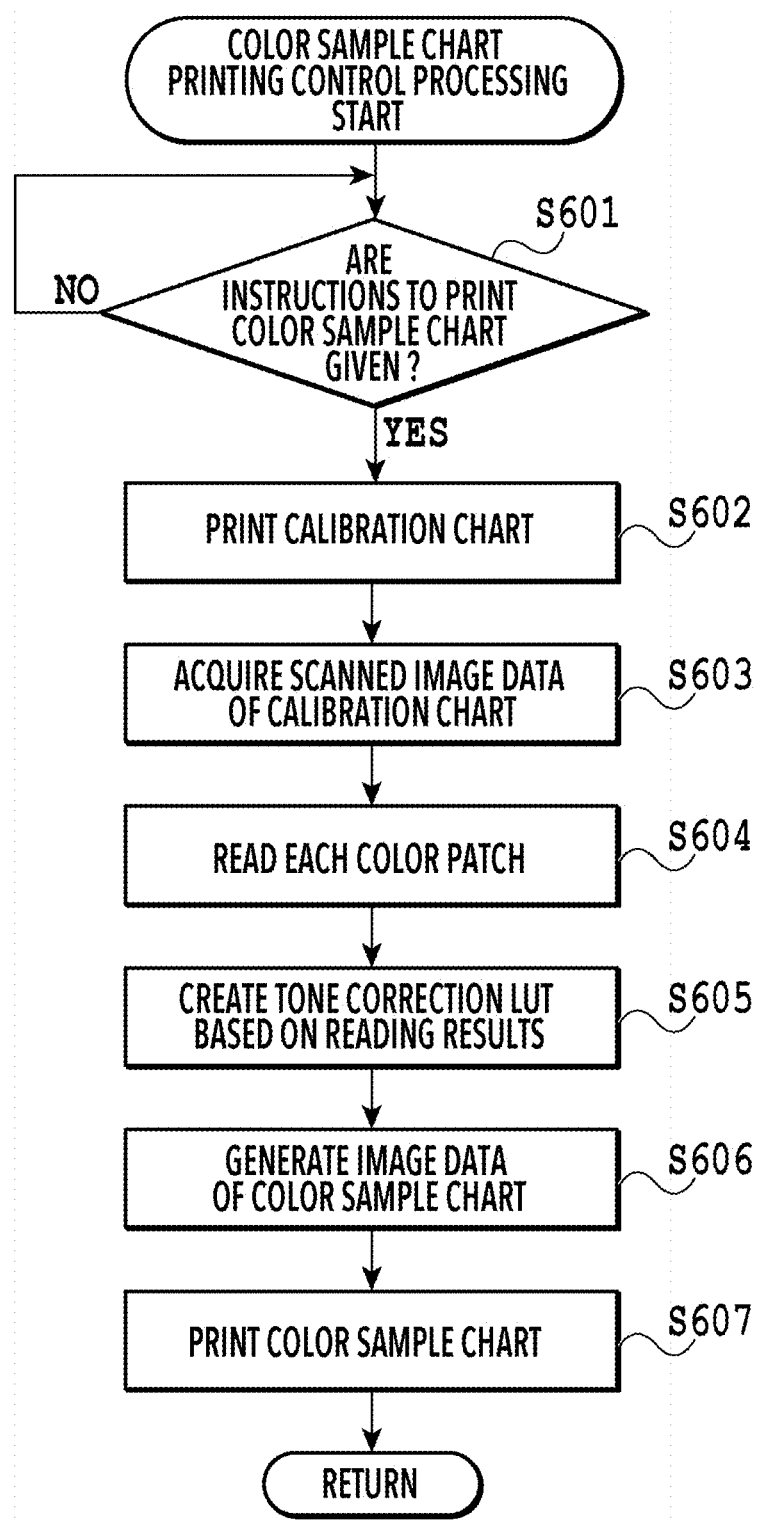
FIG. 6 is a flowchart showing a flow of printing control processing of a color sample chart.

FIG. 6 is a flowchart showing details of the color sample chart printing control processing (S303) in the flow in FIG. 3 described above. In the following, detailed explanation is given along the flowchart in FIG. 6. In the following explanation, symbol "S" means a step.

At S601, whether or not instructions to print a color sample chart are given is determined, specifically, whether the "Print" button 403 on the UI screen shown in FIG. 4A is pressed down is determined. In a case where the pressing down of the "Print" button 403 is detected, the processing advances to S602 and in a case where it is not detected, button pressing-down monitoring processing is continued at predetermined intervals.

Figure 7:
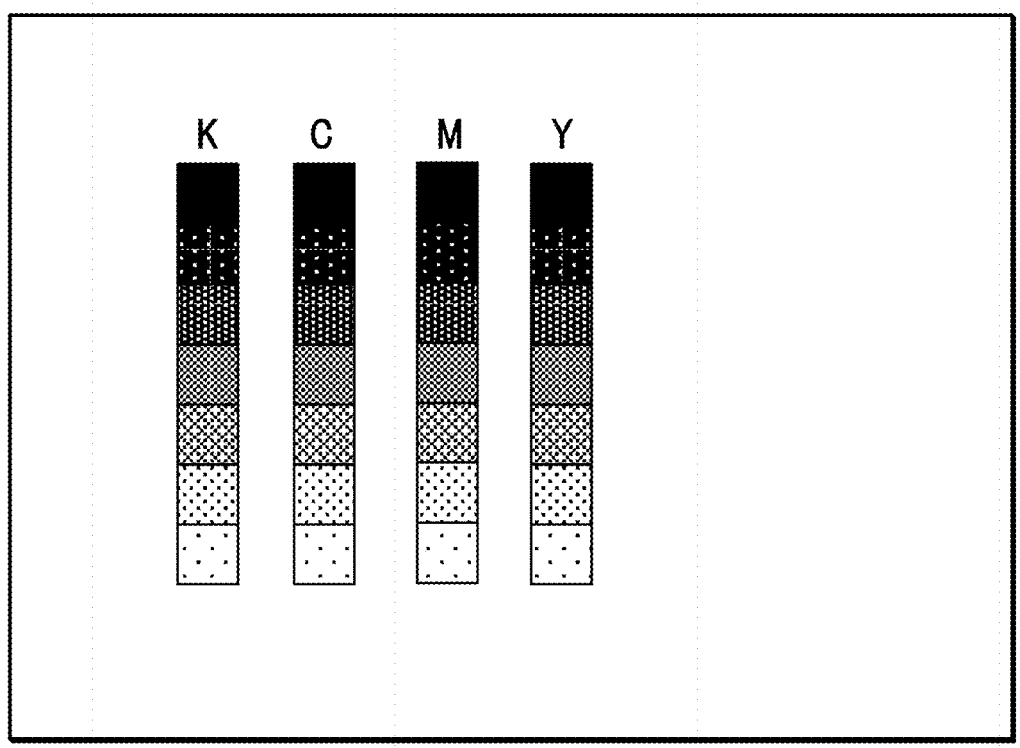
FIG. 7 is a diagram showing an example of a calibration chart.

At S602, in order to perform tone calibration prior to printing of the color sample chart, a dedicated chart (hereinafter, called "calibration chart") is printed. FIG. 7 shows an example of a calibration chart. The calibration chart shown in FIG. 7 includes seven color patches for each color of CMYK, which change in seven levels from a pale color to a dark color. Here, for simplification of explanation, the color patches have seven tones for each color, but by increasing the number of tones to, for example, 64 for each color, highly accurate calibration is enabled. At the time of performing this step, it may also be possible in parallel to notify a user that calibration is performed prior to color sample chart printing by displaying a message to that effect on the UI unit 124, reporting that by a voice, and so on.

At S603, scanned image data of the calibration chart that is printed and output is acquired. At this time, first, a message that prompts a user to scan the calibration chart is displayed on the UI unit 124. Then, in response to instructions to start a scan by a user (for example, pressing down of "Start scan" button), the calibration chart is read by the scan unit 127. Due to this, the scanned image data of the calibration chart is acquired.

At S604, from the scanned image data acquired at S603, the luminance value of each color patch is read. Then, the read luminance value of each color patch is converted into a density value by using a luminance/density conversion table obtained in advance.

Figure 8:
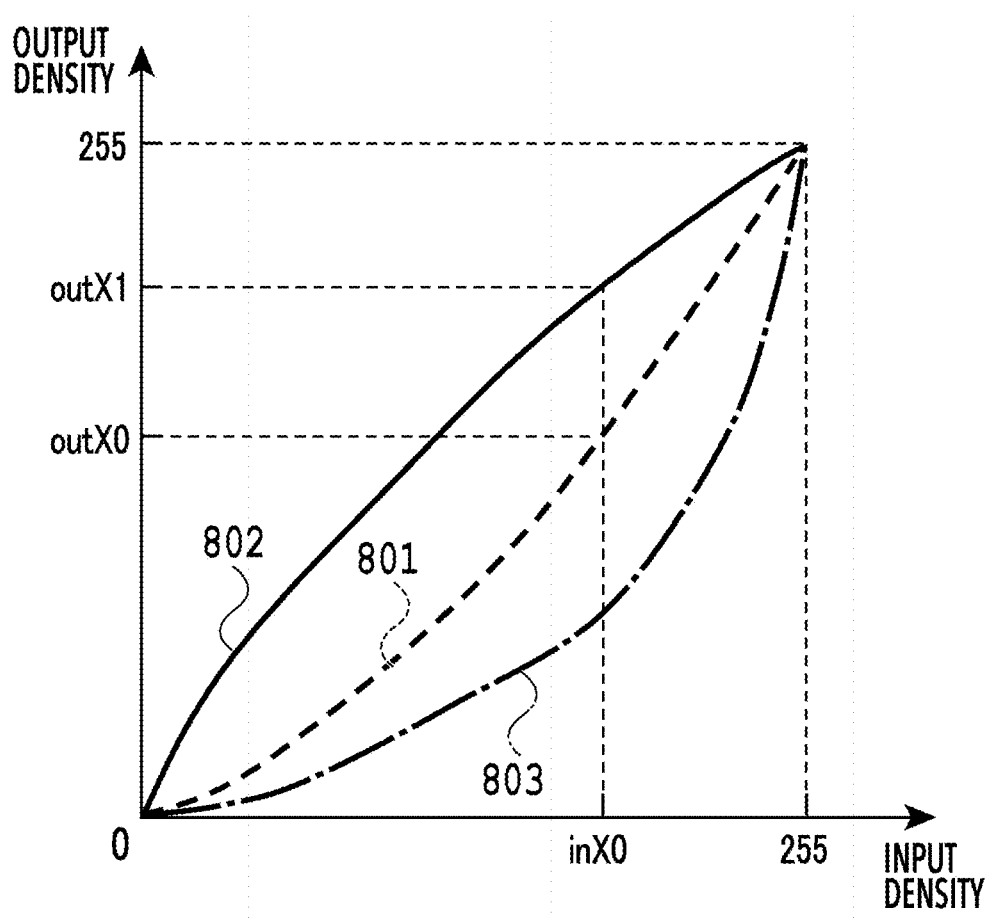
FIG. 8 is a graph showing an example of a tone characteristic of a print unit.

At S605, based on the density value of each color patch obtained at S604, a tone correction LUT that brings the tone characteristic of the print unit 126 into the standard state is created newly. FIG. 8 is a graph showing an example of the tone characteristic of the print unit 126. In the graph in FIG. 8, the horizontal axis represents the input density value and the vertical axis represents the output density value. The tone characteristic may be different in each color of CMYK, but here, explanation is given by assuming that CMYK have a common tone characteristic. In the graph in FIG. 8, a broken line 801 indicates the ideal tone characteristic in a case where the tone characteristic of the print unit 126 is in the standard state and a solid line 802 indicates the actual tone characteristic obtained by plotting the density values obtained by reading the calibration chart. This example shows that the state is shifted to a state where the output density is higher than that in the standard state. In a case where the color sample chart is printed and output in this state, each color patch is printed in the state where the density is higher than that in the standard state, and therefore, an inaccurate destination color is set as a result. Consequently, a new tone correction LUT capable of implementing a relationship between the input density value and the output density value is created, which cancels the tone characteristic indicated by the solid line 802 so that the tone characteristic of the print unit 126 becomes the standard state indicated by the broken line 801. In the graph in FIG. 8, a one-dot chain line 803 indicates the tone characteristic of the tone correction LUT created newly in order to implement the tone characteristic in the standard state. Here, the example is shown in which the density value is represented by eight bits (256 tones), but the example is not limited to this. The tone correction LUT thus created newly is set (updated) as the tone correction LUT 213 used by the gamma correction unit 202.

At S606, image data representing the color sample chart described above is generated, predetermined image processing is performed for the generated image data, and print data used to print the color sample chart is generated. Specifically, first, the color conversion unit 201 performs color conversion processing using the general color conversion LUT 211, next, the gamma correction unit 202 performs gamma correction processing by using the tone correction LUT 213 that is set at S605, and next, the halftone processing unit 203 performs halftone processing. The print data of the color sample chart thus obtained is sent to the print unit 126.

At S607, the print data of the color sample chart generated at S606 is printed and output from the print unit 126.

The above is the contents of the color sample chart printing control processing according to the present embodiment. Due to this, in the situation in which it is guaranteed that the tone characteristic of the print unit 126 is in the standard state, an ideal color sample chart is obtained. In the present embodiment, explanation is given by taking as an example the type of calibration that prints and outputs a chart, but the type of calibration may be a type of calibration that directly prints a color patch on a transfer belt and the like and does not output a chart. In this case, S603 can be omitted.

Effects of the Present Embodiment

Figure 9A:
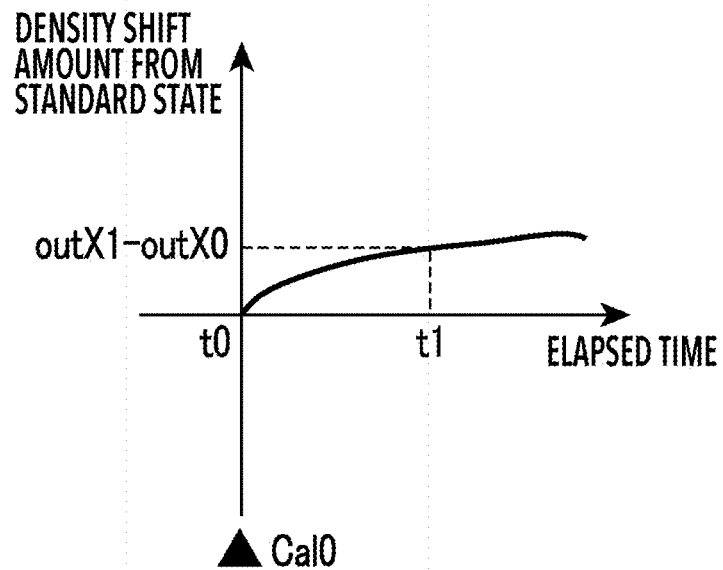
FIG. 9A and FIG. 9B are each a diagram showing a relationship between an elapsed time t from the start of use of a printer and a density shift amount from a standard state of the print unit.
Figure 9B:
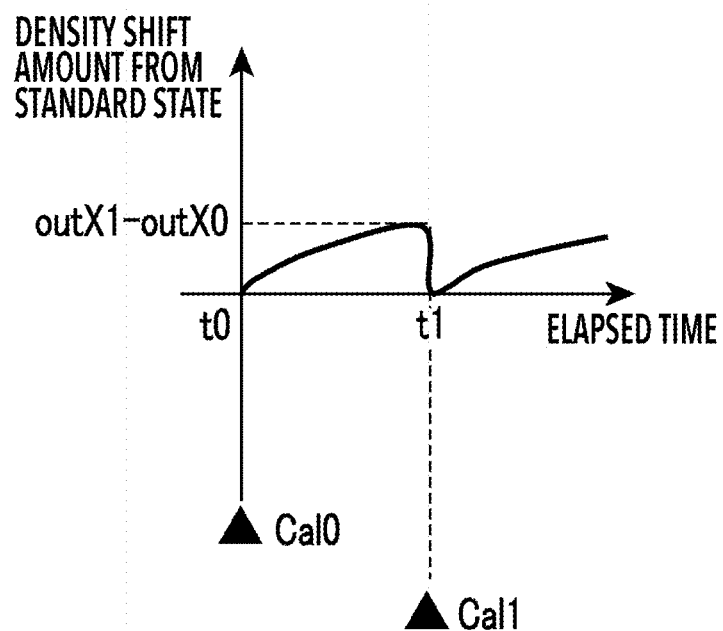

Here, the meaning and effects of printing a color sample chart by the method of the present embodiment are explained. FIG. 9A and FIG. 9B are each a diagram showing a relationship between an elapsed time t from the start of use of the printer 120 and a density shift amount from the standard state of the print unit 126. With reference also to FIG. 8 described previously, explanation is given below.

Here, it is assumed that calibration (Cal0) is performed in a case where the elapsed time t is "t0". At this time, the tone characteristic of the print unit 126 after performing gamma correction by applying the tone correction LUT created by the calibration is the tone characteristic indicated by the broken line 801 in the graph in FIG. 8 described previously.

That is, in a case where the input density value is "inX0", the output density value is "outX0". After that, the use of the printer 120 is continued and in a case where the elapsed time t becomes "t1", it is assumed that the tone characteristic of the print unit 126 has changed to the tone characteristic indicated by the solid line 802 in the graph in FIG. 8 described previously. That is, it is assumed that the output density value corresponding the input density value "inX0" has changed to "outX1". FIG. 9A shows the elapsed time t and the change in the density shift amount from the standard state in a case where the input density value is "inX0" and it is known that the density shift amount increases as time elapses. In this state, that is, in a case where the color sample chart is printed without performing calibration after "t1" elapses from the execution of the calibration at timing of "Cal0", the printing is performed in the situation in which the tone characteristic of the print unit 126 is shifted from the standard state.

In contrast to this, in a case of the method of the present embodiment, the calibration is performed at "Cal0" and in a case where instructions to print the color sample chart are given at the point in time of the elapsed time of "t1", calibration is performed before the printing ("Cal1" in FIG. 9B). By performing the calibration at this timing, the tone characteristic of the print unit 126 returns to the standard state, and therefore, the density shift amount is also reset to "0". As described above, in a case of the method of the present embodiment, it is guaranteed that the tone characteristic of the print unit 126 is brought into the standard state prior to printing and outputting of the color sample chart, and therefore, it is possible to appropriately perform the subsequent destination color setting, which in turn makes it possible to perform special color conversion desired by a user.

Modification Example 1

The object of the present embodiment is to make it possible to print and output the color sample chart in the situation in which the tone characteristic of the print unit 126 is returned to the standard state. Looking at things from the other way around, this means that, for example, in a situation in which it is estimated that the tone characteristic is in the standard state, such as the situation immediately after execution of calibration, it may not necessarily be required to perform calibration. Consequently, in a case where Yes is determined at S601 of the flow in FIG. 6 described previously, it may also be possible to additionally perform determination of whether or not execution of calibration is necessary. This determination of whether or not execution of calibration is necessary is performed by determining whether a predetermined condition is satisfied, for example, whether or not calibration has already been performed within a predetermined period, whether the number of sheets for which printing processing has been performed after execution of the most recent calibration is within a predetermined number, and so on. What is required is to make it possible to check whether the situation is such that the density variation in the print unit 126 is small and it is possible to guarantee the tint. Then, it is sufficient to skip S602 to S605 in a case where calibration has already been performed within a predetermined period or the number of sheets for which printing processing has been performed is within a predetermined number. By doing the control such as this, it is possible to suppress execution of unnecessary calibration and this leads to a saving of chart sheets accompanying calibration and a reduction in time and effort of a user.

Modification Example 2

Normally, the screen ruling (number of lines of dots per inch on a halftone screen) that is applied to the halftone processing by the halftone processing unit 203 is different depending on the kind of object. For example, in a case of text, the ruling is high, in a case of graphics, the ruling is medium, in a case of image (photo), the ruling is low, and so on. Further, in a case where the screen ruling is different, the tone characteristic is also different because of the difference in the structure. Because of this, it is necessary to perform calibration the number of times corresponding to the number of kinds of screen ruling that can be set. For example, in a case where there are three kinds of ruling, such as the high ruling, the medium ruling, and the low ruling as described above, it is also necessary to print three calibration charts and create three tone correction LUTs.

Consequently, in the chart printing processing at S602, it may also be possible to specify the object to which the adjustment-target color set by a user belongs and print the calibration chart for the screen ruling corresponding to the kind of object. For example, in a case where the kind of object to which the adjustment-target color belongs is text, it is sufficient to print one calibration chart for the high ruling. In a case where the control such as this is performed, at S301 of the flow in FIG. 3 described previously, the information on the kind of object to which the adjustment-target color set by a user belongs is stored in advance. Further, the screen ruling used by the halftone processing unit 203 is set to that corresponding to the kind of object so that the halftone processing suitable to the determined kind of object is performed.

According to the present modification example, in accordance with the kind of object to which the adjustment-target color belongs, only the necessary calibration is performed, and therefore, as in the modification example 1, a saving of sheets to be output and a reduction in time and effort of a user will result. Further, it is possible to obtain the same effect by a user specifying a specific screen ruling and performing control so that only the calibration corresponding thereto is performed, in place of determining the screen ruling in accordance with the kind of object to which the adjustment-target color belongs.

Modification Example 3

Among printers, there is a printer that comprises a function of multidimensional calibration for a combination of CMYK (hereinafter, called "multinary color calibration"). In this case, it may also be possible to further perform the multinary color calibration after performing one-dimensional calibration for each color of CMYK described above. Specifically, first, as described previously, the one-dimensional calibration for each color of CMYK is performed (S602 to S605). Following this, by performing the multinary color calibration, a multinary color correction LUT corresponding to a combination of CMYK is created by the LUT creation unit 205. The created multinary color correction LUT is used by a multinary color correction unit, not shown schematically, in color correction processing for bitmap data for which gamma correction has been performed, and bitmap data for which the color correction has been performed is output to the halftone processing unit 203. As described above, it may also be possible to perform the multinary color calibration following the one-dimensional calibration.

As above, according to the present embodiment, at the point in time at which printing of the color sample chart is performed, it is guaranteed that the tone characteristic of the printer is in the standard state. Because of this, it is made possible to prevent the color sample chart from being printed in the situation in which the tone characteristic of the printer is shifted from the standard state. As a result of that, it is possible to obtain an appropriate special color conversion LUT and implement ideal special color conversion.

Second Embodiment

In the first embodiment, the aspect is explained in which the tone characteristic of the own printer is brought into the standard state prior to printing of a color sample chart in a case where a color sample chart for special color conversion is printed and output. Next, an aspect is explained as a second embodiment in which in order to make the same the color reproduction characteristic among different printers, the tone characteristic of another printer is brought into the standard state at the time of printing and outputting a color sample chart by the other printer other than the own printer. Explanation of the contents in common to those of the first embodiment is omitted and in the following, different points are explained mainly.

<Configuration of Print System>

Figure 10:
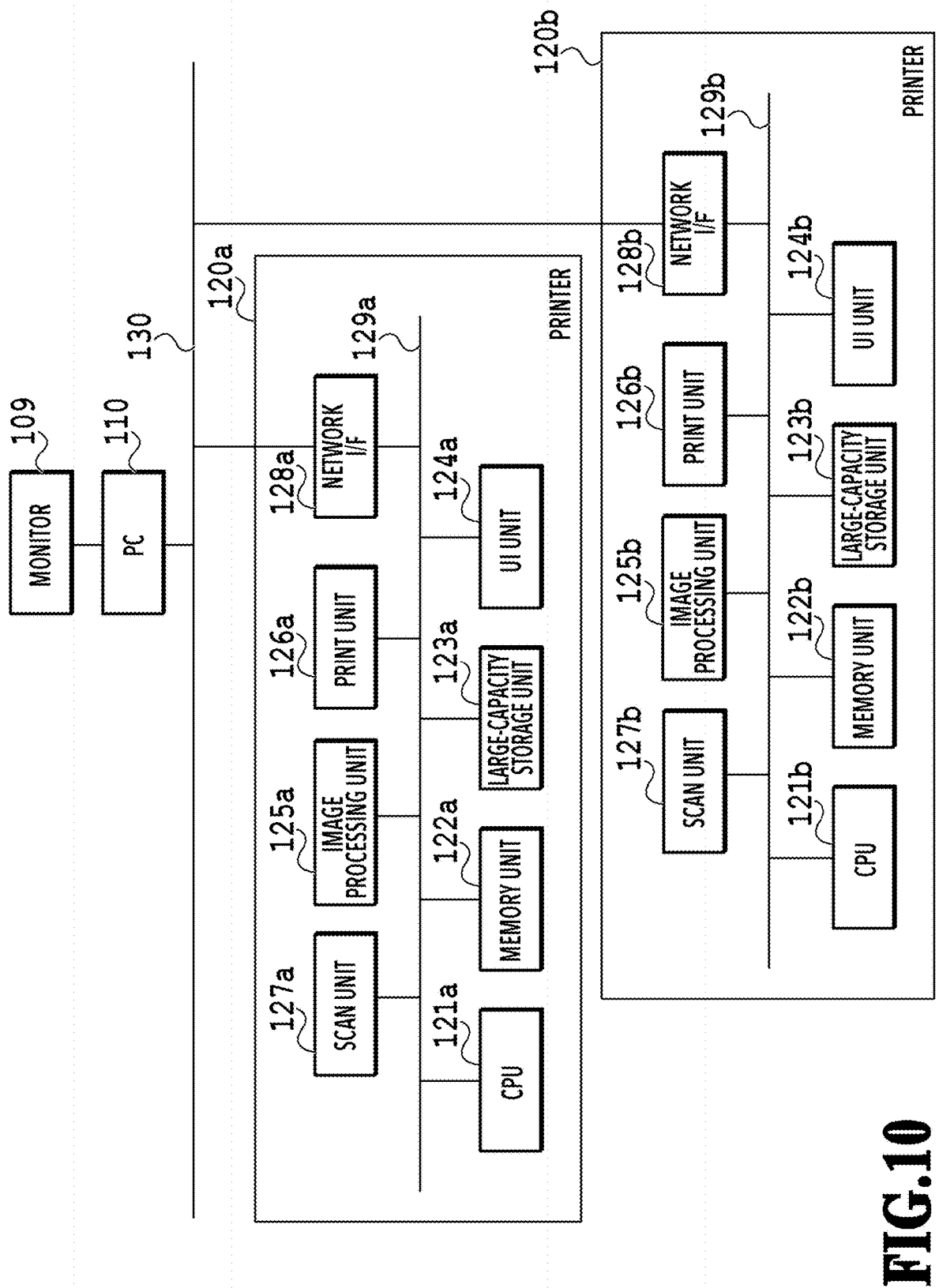
FIG. 10 is a block diagram showing an example of a configuration of a print system according to a second embodiment.

FIG. 10 is a diagram showing an example of a configuration of a print system according to the present embodiment. FIG. 10 differs from FIG. 1 in the first embodiment in that two printers 120a and 120b are connected to the network 130. Here, the printer 120a and the printer 120b have quite the same configuration, but they may have separate hardware configurations. In the following, explanation is given by taking a case as an example where inter-device color adjustment to match the color reproducibility of the printer 120a with the color reproducibility of the printer 120b is performed. The hardware configuration of the printers 120a and 120b and the internal configuration within the image processing unit 125 do not differ from those of the first embodiment, and therefore, explanation thereof is omitted. To symbols indicating the hardware configuration and the function block of the printer 120a, a suffix "a" is attached and to symbols indicating the hardware configuration and the function block of the printer 120b, a suffix "b" is attached in order to make a distinction therebetween.

<Explanation of Creation of Special Color Conversion Table>

Figure 11:
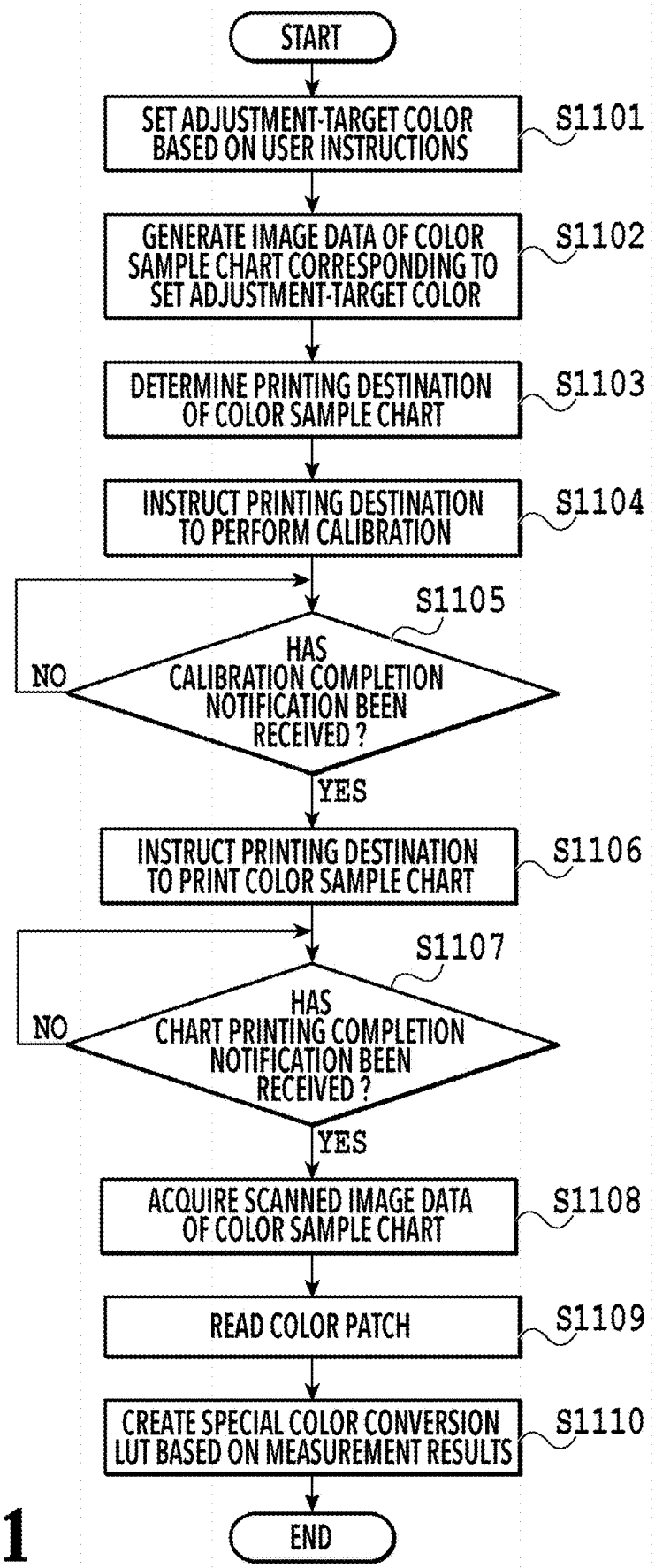
FIG. 11 is a flowchart showing a flow of processing to create a special color conversion LUT according to the second embodiment.

FIG. 11 is a flowchart showing a flow of processing for the image processing unit 125 of the printer 120a to create the special color conversion LUT 212 based on the color sample chart printed and output by the printer 120b according to the present embodiment. In the following, along the flowchart, a series of flows of creation of the special color conversion LUT is explained. In the following explanation, symbol "S" means a step.

Figure 12:
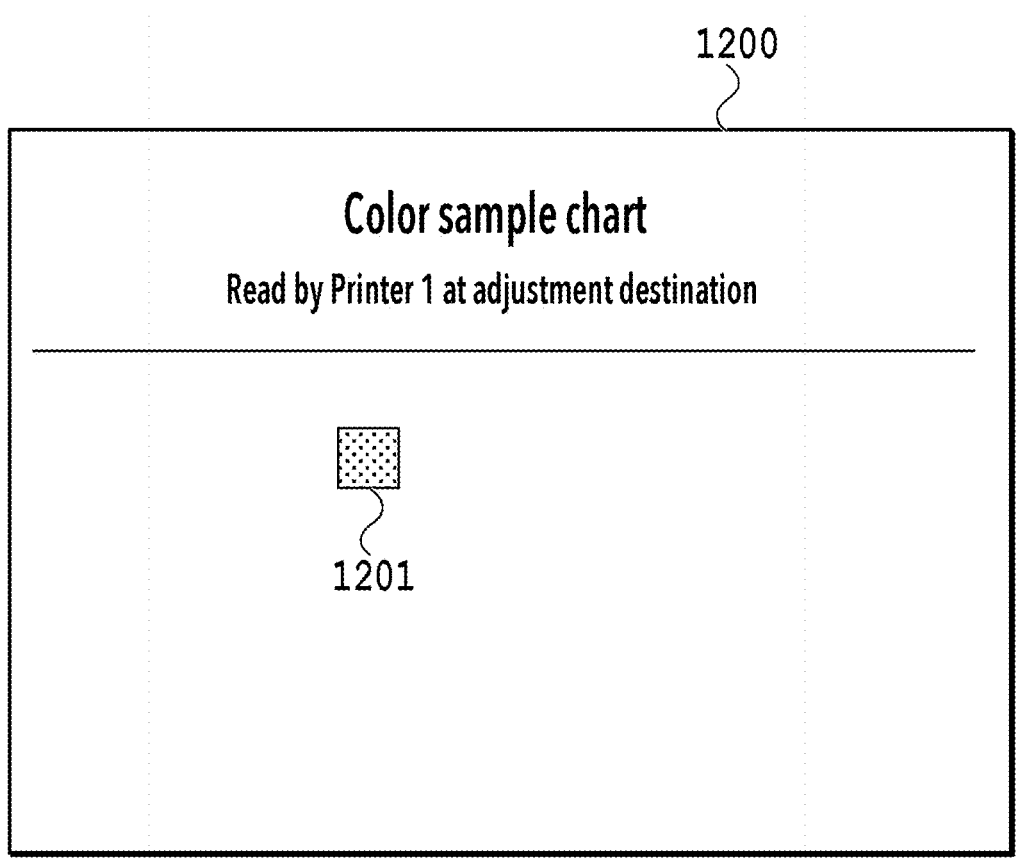
FIG. 12 is a diagram showing an example of a color sample chart.

At S1101, as at S301 in the flow in FIG. 3 of the first embodiment, a specific adjustment-target color is set via the UI unit 124. At S1102 that follows, image data of a color sample chart corresponding to the adjustment-target color set at S1101 is generated. FIG. 12 shows an example of a color sample chart according to the present embodiment. In a Color sample chart 1200 shown in FIG. 12, one color patch 1201 corresponding to the adjustment-target color is formed. Here, on the premise that only the one adjustment-target color is set, one color patch is formed, but in a case where a plurality of adjustment-target colors is set, color patches corresponding to the number of set adjustment-target colors are formed.

Figure 13:
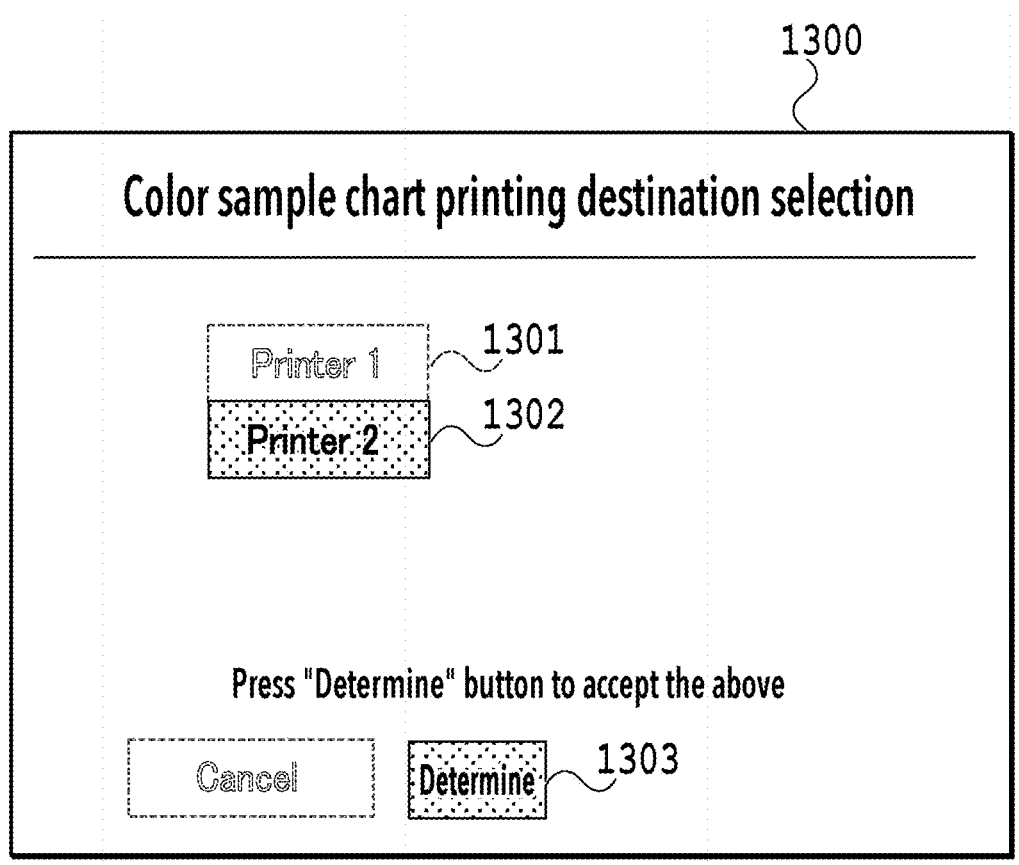
FIG. 13 is a diagram showing an example of a UI screen for specifying a printing destination of the color sample chart.

At S1103, the printer (printing destination) that prints and outputs the image data of the color sample chart generated at S1102 is determined via a UI unit 124a. FIG. 13 is an example of a UI screen that is displayed on the UI unit 124a at this time. On a UI screen 1300 shown in FIG. 13, a "Printer 1" button 1301 indicating the printer 120a and a "Printer 2" button 1302 indicating the printer 120b exist. Here, an attempt is made to match the color reproduction characteristic of the printer 120a with that of the printer 120b between the two printers 120a and 120b connected to the print system shown in FIG. 10. Consequently, a user selects the "Printer 2" button 1302 indicating the reference printer 120b and presses down a "Determine" button 1303. In this manner, a user determines the printer, which is the printing destination of the color sample chart, by using the UI screen as shown in FIG. 13. The pressing down of the "Determine" button 1303 is equivalent to the instructions to print the color sample chart at S601 described previously.

At S1104, instructions to perform calibration are transmitted to the printer in order to bring the tone characteristic of the printer into the standard state prior to printing and outputting of the color sample chart in the printer at the printing destination determined at S1103. The operation of the calibration in the printer at the printing destination, which has received the execution instructions, will be described later. At this time, in a case where the printer 120a and the printer 120b are made by the same maker, it is possible to use the common control protocol used in the maker. With the common control protocol, it is possible to easily give instructions to perform calibration and perform the operation control of the calibration in accordance with the instructions. Further, even in a case where those printers are made by different makers, on a condition that the control protocol is disclosed, it is possible to similarly give instructions to perform calibration and perform the operation control between the printers.

At S1105, whether a notification indicating that the execution of the calibration is completed (hereinafter, called "calibration completion notification") has been received from the printer at the printing destination is determined. In a case where the printer at the printing destination (here, the printer 120b) has issued a calibration completion notification and the reception thereof is detected, the processing advances to S1106. On the other hand, in a case where it is not possible to detect the reception of a calibration completion notification, reception monitoring processing of a calibration completion notification is continued at predetermined intervals.

In a case where it is checked that the tone characteristic of the printer at the printing destination has entered the standard state due to the completion of the calibration, at S1106, instructions to print the color sample chart are transmitted to the printer. At this time, the image data of the color sample chart is transmitted together. The printing operation of the color sample chart in the printer at the printing destination (here, the printer 120b) will be described later.

At S1107, processing to monitor whether a notification indicating that the printing of the color sample chart is completed (hereinafter, called "chart printing completion notification") has been received from the printer at the printing destination is performed. In a case where the printer at the printing destination (here, the printer 120b) has issued a chart printing completion notification and the reception thereof is checked, the processing advances to S1108.

At S1108, as at S603 in the flow in FIG. 6 of the first embodiment, scanned image data of the color sample chart that is printed and output is acquired. At this time, first, a message prompting a user to scan the color sample chart is displayed on the UI unit 124a. Then, in response to instructions to start the scan by a user, the color sample chart is read by a scan unit 127a. Due to this, the scanned image data of the color sample chart (here, Color sample chart 1200) printed and output from the reference printer 120b is acquired.

At S1109, from the scanned image data acquired at S1108, the luminance of the color patch (here, the one color patch 1201) is measured. Then, at S1110, based on the luminance value (here, RGB values) as measurement results obtained at S1109, a special color conversion table is created. Specifically, a special color conversion table is created that outputs, in a case where RGB values corresponding to the adjustment-target color set at the S1101 are input, CMYK values capable of reproducing the color represented by the color patch of the color sample chart printed by the printer 120b. At this time, first, the RGB values (RP1, GP1, BP1), which are the measurement results of the color patch, are converted into color values (here, Lab values) in the standard color space by using an LUT or the like indicating the relationship between RGB values and Lab values, which is specified in advance. Next, by using the LUT or the like indicating the relationship between Lab values and CMYK values, which is specified in advance, CMYK values (CP1, MP1, YP1, KP1) that are output values of the printer are found from the converted Lab values. In this manner, it is possible to obtain a special color conversion table that associates with each other the RGB values (RP1, GP1, BP1), which are the input values, and the CMYK values (CP1, MP1, YP1, KP1), which are the output values. Here, the reason the CMYK values are found by interposing in between the color values in the Lab color space, which is the standard space, is that the printer 120a and the printer 120b are separate apparatuses. By temporarily replacing the color reproduced by the printer 120b with the color values in the standard color space and then converting the color values into CMYK values, it is made possible also for the printer 120a to accurately reproduce the same color. The standard color space is not limited to the Lab color space and the XYZ color space or the like may also be accepted.

The above is the flow until the special color conversion LUT 212 is created in the image processing unit 125 of the printer 120a according to the present embodiment.

<Execution of Calibration in Printer at Printing Destination>

Figure 14:
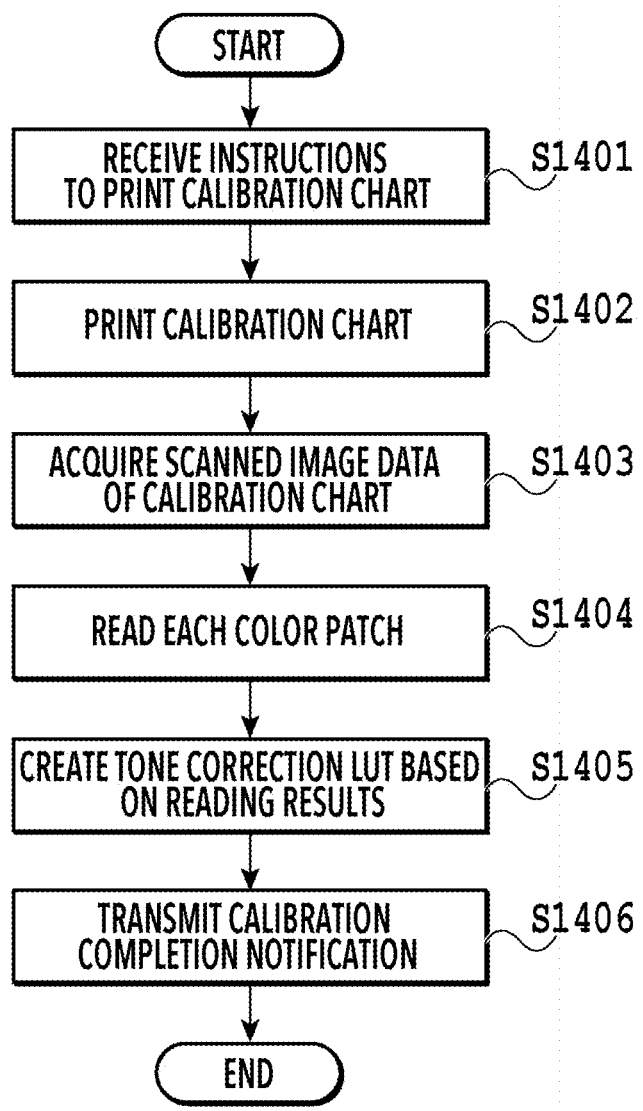
FIG. 14 is a flowchart showing a flow of calibration in a printer at a printing destination.

Following the above, the calibration operation performed in the printer at the printing destination is explained. In the present embodiment, based on instructions from the printer 120a as the "Printer 1", calibration is performed by the LUT creation unit 205 within an image processing unit 125b of the printer 120b as the "Printer 2". In the following, explanation is given along the flowchart in FIG. 14. The series of processing shown in FIG. 14 is started in response to that transmission of instructions to perform calibration from the external printer (here, the printer 120a) is detected. Further, accompanying the start of the calibration operation, the UI unit 124b of the printer 120b changes to the display screen (not shown schematically) in the calibration mode and enters the state of not receiving another job. After the calibration is completed, the printer 120b returns to the state of capable of receiving another job.

At S1401, instructions to perform calibration from the printer 120a are received. Each piece of processing at next S1402 to S1405 corresponds to each at S602 to S605 in the flow in FIG. 6 of the first embodiment. That is, by a print unit 126b, the calibration chart is printed (S1402) and the scanned image data thereon is acquired and the luminance value of the color patch is read (S1403 and S1404). Then, based on the reading results, a tone correction LUT is created and set (updated) as the tone correction LUT 213 used in the gamma correction unit 202 (S1405).

Then, at S1406, a calibration completion notification indicating that the calibration is completed is transmitted to the printer (here, the printer 120a) having transmitted the instructions to perform calibration.

The above is the contents of the calibration operation in the printer at the printing destination.

<Printing of Color Sample Chart in Printer at Printing Destination>

Figure 15:
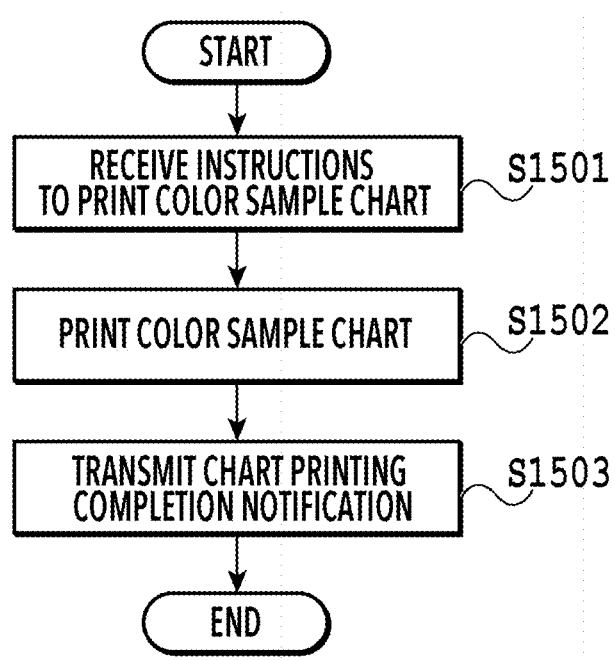
FIG. 15 is a flowchart showing a flow of printing processing of the color sample chart in the printer at the printing destination.

Following the above, printing and outputting of a color sample chart performed in the printer at the printing destination are explained. In the present embodiment, based on printing instructions from the printer 120a as the "Printer 1", printing processing of a color sample chart is performed in the printer 120b as the "Printer 2". In the following, explanation is given along the flowchart in FIG. 15.

At S1501, along with image data of the color sample chart, printing instructions thereof are received from the printer 120a. At S1502 that follows, the same predetermined image processing as that at S606 described previously is performed in the image processing unit 125b within the printer 120b and the image data is converted into print data and the color sample chart is printed and output in the print unit 126b. Then, at S1503, a chart printing completion notification indicating that the printing and outputting of the color sample chart are completed is transmitted to the printer 120a having transmitted the execution instructions.

The above is the contents of the printing and outputting of the color sample chart in the printer at the printing destination.

As above, according to the present embodiment, at the point in time at which printing of a color sample chart is performed by another printer, it is guaranteed that the tone characteristic of another printer is in the standard state. Consequently, it is made possible to prevent the color sample chart from being printed in the situation in which the tone characteristic of another printer is shifted from the standard state, and therefore, it is made possible to appropriately make the same the color reproduction characteristic between different printers.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

According to the technique of the present disclosure, it is possible to print a color sample in a situation in which it is guaranteed that the tone characteristic of a printer is in the standard state.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-239172, filed Dec. 27, 2019 which is hereby incorporated by reference wherein in its entirety.

What is claimed is:

1. An image processing apparatus comprising:
a printer; and
one or more processors configured to:
receive designation of a target color by a user;
specify, based on the designated target color, one or more candidate colors;
perform a color conversion process such that, for converting the designated target color to a color selected from the specified one or more candidate colors, the printer prints a predetermined color sample including the specified one or more candidate colors;
perform calibration in response to reception of an instruction for performing the color conversion process from the user;
perform, after the calibration is completed, a predetermined image processing based on a result of the calibration on image data representing the predetermined color sample; and
cause the printer to print the predetermined color sample based on the image data subjected to the predetermined image processing.

2. The image processing apparatus according to claim 1, wherein the one or more processors:
determines whether or not it is necessary to perform the calibration upon receipt of the instruction for performing the color conversion process;
perform, in a case of determining that it is not necessary to perform the calibration, the color conversion process without performing the calibration.

3. The image processing apparatus according to claim 2, wherein the one or more processors determines that it is not necessary to perform the calibration in a case where the calibration has already been performed within a predetermined period.

4. The image processing apparatus according to claim 1, wherein the predetermined image processing includes gamma correction processing.

5. The image processing apparatus according to claim 1, wherein the one or more processors specify a type of an object including the designed target color and perform calibration corresponding to the specified type.

6. The image processing apparatus according to claim 1, wherein the one or more processors notify a user that the calibration is performed.

7. The image processing apparatus according to claim 6, further comprising:
a user interface unit configured to receive user instructions,
wherein the control unit performs the notification by displaying a message to the effect that the calibration is performed on the user interface unit.

8. A method or controlling an image processing apparatus including a printer, the method comprising:
receiving designation of a target color by a user;
specifying, based on the designated target color, one or more candidate colors;
performing a color conversion process such that, for converting the designated target color to a color selected from the specified one or more candidate colors, the printer prints a predetermined color sample including the specified one or more candidate colors;
performing calibration in response to reception of an instruction for performing the color conversion process from the user;
performing, after the calibration is completed, a predetermined image processing based on a result of the calibration on image data representing the predetermined color sample; and
causing the printer to the predetermined color sample based on the image data subjected to the predetermined image processing.

9. The method according to claim 8, further comprising:
determining whether or not it is necessary to perform the calibration upon receipt of the instruction for performing the color conversion process;
performing, in a case of determining that it is not necessary to perform the calibration, the color conversion process without performing the calibration.

10. The method according to claim 8, wherein the predetermined image processing includes gamma correction processing.

11. A non-transitory computer readable storage medium storing a program for causing a computer to perform a method or controlling an image processing apparatus including a printer, the method comprising:
receiving designation of a target color by a user;
specifying, based on the designated target color, one or more candidate colors;
performing a color conversion process such that, for converting the designated target color to a color selected from the specified one or more candidate colors, the printer prints a predetermined color sample including the specified one or more candidate colors;
performing calibration in response to reception of an instruction for performing the color conversion process from the user;
performing, after the calibration is completed, a predetermined image processing based on a result of the calibration on image data representing the predetermined color sample; and
causing the printer to the predetermined color sample based on the image data subjected to the predetermined image processing.

12. The non-transitory computer readable storage medium according to claim 11, further comprising:
determining whether or not it is necessary to perform the calibration upon receipt of the instruction for performing the color conversion process;
performing, in a case of determining that it is not necessary to perform the calibration, the color conversion process without performing the calibration.

13. The non-transitory computer readable storage medium according to claim 11, wherein the predetermined image processing includes gamma correction processing.

* * * * *